Feb. 13, 1968 W. KASTEN 3,368,681
WATER DISCHARGE DEVICE
Filed March 12, 1965 2 Sheets-Sheet 1
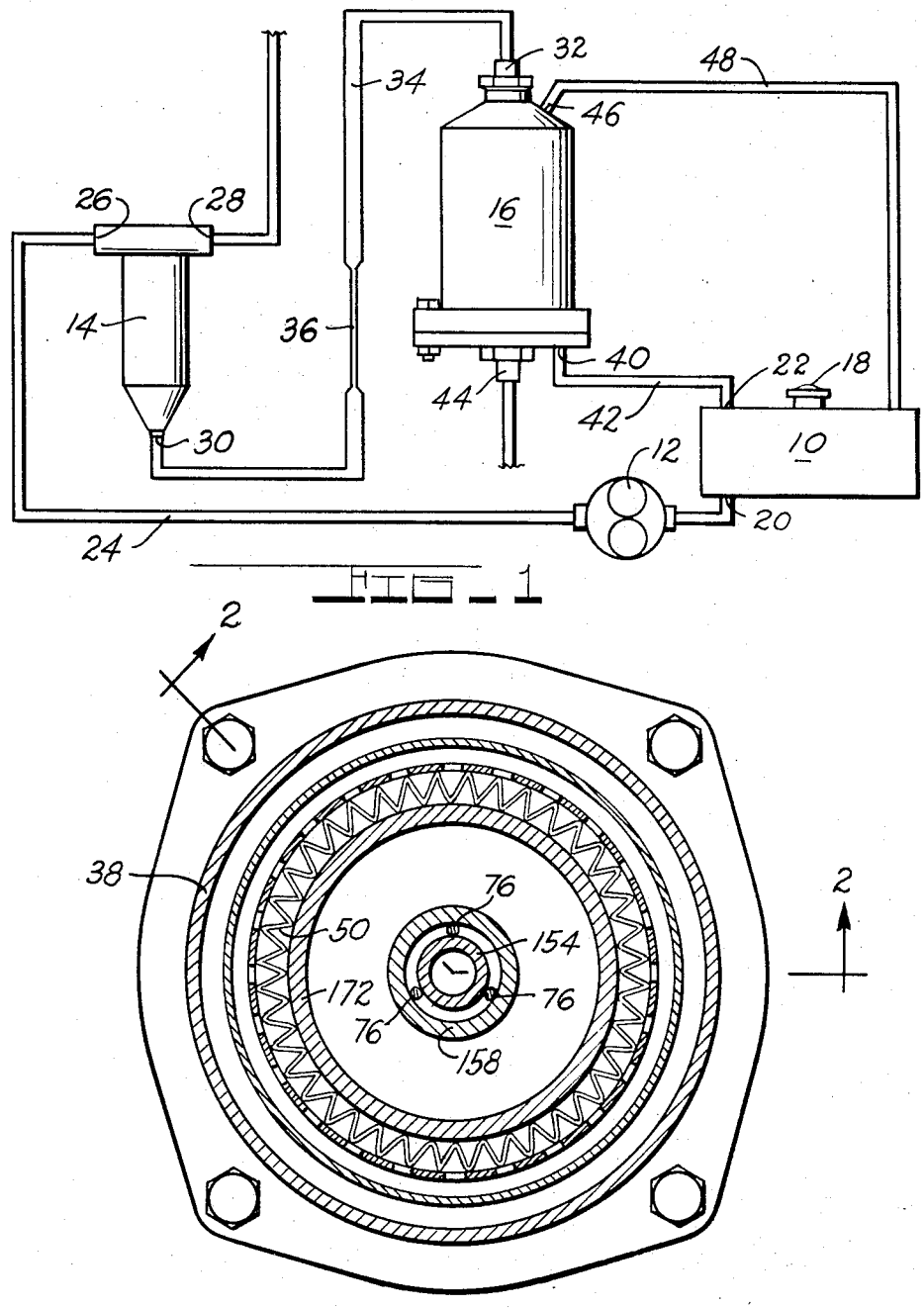
INVENTOR.
WALTER KASTEN.
BY
*William N. Antoies*
ATTORNEY.

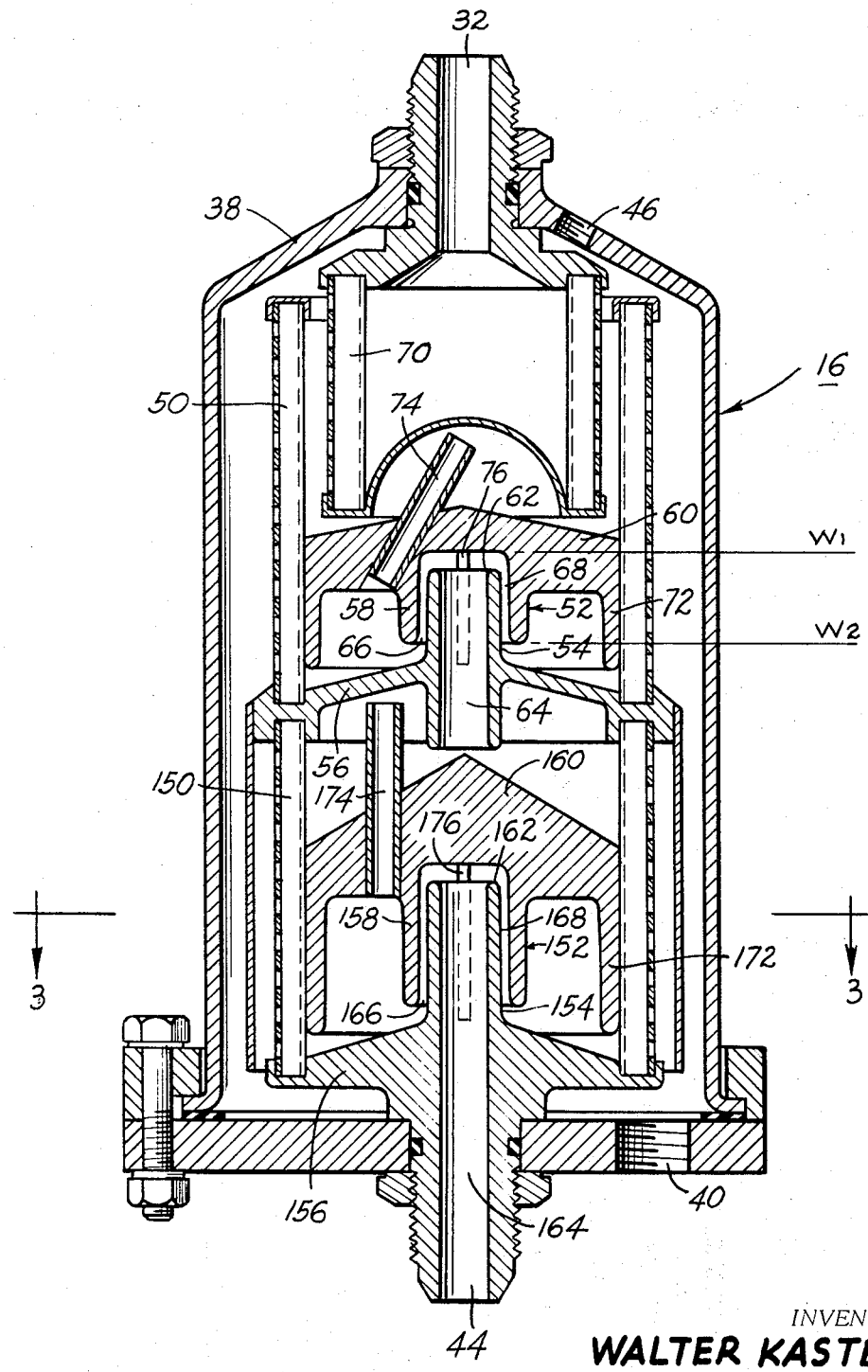

United States Patent Office 3,368,681
Patented Feb. 13, 1968

3,368,681
WATER DISCHARGE DEVICE
Walter Kasten, Madison Heights, Mich., assignor to The Bendix Corporation, Madison Heights, Mich., a corporation of Delaware
Filed Mar. 12, 1965, Ser. No. 439,191
6 Claims. (Cl. 210—114)

ABSTRACT OF THE DISCLOSURE

The following relates to a water discharge device, for use in connection with the sump port of a fuel filter water separator, which utilizes a hydrophobic partition to separate coalesced water from fuel and a syphon-type water drain outlet to discharge the coalesced water. A block-type deflector is utilized to reduce the effective volume of the syphon chamber, so that a more rapid rise of fluid will occur therein, and to permit maximum use of the fluid velocity head by deflecting fluid flow directly against the hydrophobic partition.

---

It is common knowledge that operators of motor vehicles which utilize internal combustion engines for power plants are faced with the problem of supplying clean water free fuel to the power plant. If multifuel or diesel power plants are used, this problem becomes considerably more critical. These latter power plants do not use carburetors, but use fuel injection pumps having close fitting pistons and small clearances between various moving parts. In such systems, fuel is forced under very high pressures through the relatively small orifices of the fuel injection nozzles into the combustion chamber. If any solid and/or water contaminants are present in the fuel, such contaminants will cause rapid wear of moving parts and abrasion of the small orifices in the fuel injection system.

Although most fuel, which is pumped into fuel tanks, is relatively free of solid and/or water contaminants, it is still possible for such contamination to get into such tanks. For example, such contamination could occur during the filling of fuel tanks in dusty air or during rainy weather. In addition, water can enter fuel tanks as a result of condensation during temperature changes. Even with suitable piping precautions, it has been found that up to ten percent (10%) water can accumulate in fuel tanks from the aforementioned and other occurrences.

In order to eliminate solid and water contamination from such fuel, various types of effective fuel filters and filter water separators have been developed. These devices can readily trap and separate the solid and water contaminants from the fuel and prevent these contaminants from getting into the fuel injection system. While it is relative simple to eliminate water and solid contaminants from fuel through use of a filter water separator when only small percentages of water are encountered, it becomes a problem to dispose of such water from the filter water separator sump if large percentages of water are present. For example, a modern tank may have a fuel tank capacity of 400 gallons and, if only two percent (2%) of the capacity is water, the filter-separator would be required to trap eight (8) gallons of water. Since the total volume of fuel filters used for this purpose seldom exceeds more than a fraction of one (1) gallon and the sump capacity is rarely larger than one (1) quart, it, of course, is impractical to contain eight (8) gallons of water in the sump.

Various types of float mechanisms have been utilized in an effort to discharge the water periodically as it accumulates in the sump. While most of these float mechanisms operate satisfactorily in stationary locations, no practical float mechanism has ever been developed which will function satisfactorily when installed in a military vehicle which must travel in cross-country operation, up and down steep slopes, and over rough terrain.

Capacitance type probes in conjunction with electrical solenoid valves have also been used in place of float type devices. However, these are very costly, require complicated electrical circuits, and are not fool-proof since the sensor probes occasionally become coated with waxes and detergents due to the "lacy" interface layer between the fuel and water levels.

Accordingly, it is an object of this invention to provide a floatless water discharge device which will satisfactorily separate water from fuel and will remove it from the sump of a fuel filter water separator unit in a simple and economical manner.

Another object of this invention is to provide a floatless water discharge device which can be operatively connected to the sump port of a fuel filter water separator for separating coalesced water from fuel, discharging the water, and returning the fuel to the fuel tanks.

A further object of this invention is to provide a floatless water discharge device of the type described which utilizes no moving parts and consequently is not subject to wear or decrease in efficiency.

A still further object of this invention is to provide a water discharge device for use with the sump port of a fuel filter water separator which can be made and marketed as a complete component requiring no modifications in existing fuel tanks or vehicle components.

Another object of this invention is to provide a water discharge device for use with the sump port of a fuel filter water separator which utilizes hydrophobic partition means to separate coalesced water from fuel and a syphon type water drain outlet which will discharge the coalesced water with a minimum interval of "delay time" between syphoning action.

More particularly, it is an object of this invention to provide a water discharge device for receiving coalesced water and/or fuel from the sump port of a fuel filter water separator unit which includes hydrophobic partition means for dividing said device into first and second chambers and for separating the fluid received from the sump port into a volume of water located in the first chamber and a separate volume of fuel located in the second chamber, syphon means located in the first chamber for continuously discharging water from the device after the volume of water has risen to a first predetermined level and until said water subsides to a second lower predetermined level, and a non-porous member located in the first chamber for reducing the effective volume thereof below the first predetermined level to thereby cause a more rapid rise of the fluid in the first chamber to said first predetermined level.

The above and other objects and features of the invention will become apparent from the following description of the device taken in connection with the accompanying drawings which form a part of this specification and in which:

FIGURE 1 is a schematic illustration of a typical fuel storage and dispensing system in which the invention is utilized;

FIGURE 2 is a sectional view of the novel water discharge device which is utilized in the system shown in FIGURE 1 taken along line 2—2 of FIGURE 3;

FIGURE 3 is a sectional view, taken along line 3—3 of FIGURE 2.

Referring to FIGURE 1, it will be seen that the invention is shown in connection with a typical fuel storage and dispensing system which includes a fuel storage tank 10, a suitable pump 12, a fuel filter water separator unit 14 of the type shown in application Ser. No. 335,545, filed Jan. 3, 1964, and now abandoned, or in U.S. Patent No. 2,864,505, and the novel water discharge device 16 with which this invention is concerned. The fuel storage tank 10, which is utilized for supplying fuel to the separator unit 14, includes a fill port 18, a discharge port 20, and a return port 22. A fuel line 24 communicates the discharge port 20 of the tank with the inlet port 26 of the fuel filter water separator unit 14. The fuel filter water separator also includes an outlet port 28 which can be suitably connected to an engine, and a sump port 30 which is suitably connected to the inlet port 32 of the water discharge device 16 via sump line 34. The sump line is equipped with a capillary type restrictor 36 or other suitable means which will limit the flow of fluid therethrough so that only a portion of the total flow passing through the fuel filter water separator unit is passed through the water discharge device 16 via sump port 30. The proportion of the fluid to be returned via the sump line 34 in this manner depends upon the maximum amount of water expected in the fuel. Thus, for example, if it is suspected that the fuel may contain as much as ten percent (10%) water, the restrictor would be so proportioned as to direct ninety percent (90%) of the flow through the fuel filter water separator outlet port 28 and ten percent (10%) through the fuel filter water separator sump port 30. If there is any likelihood that the water in the filter separator sump or return line might freeze, the restrictor could be proportioned so that the percentage of the flow returned to the fuel tank via the sump port would be such that the fuel returned through the sump port would exceed the maximum water concentration suspected or encountered in the fuel.

The water discharge device 16, which is shown in FIGURES 2 and 3 includes a housing 38 having the previously mentioned inlet port 32 which receives the coalesced water and/or fuel from the sump port 30 of the fuel filter water separator unit, a fuel outlet port 40, which is connected by a return line 42 to the return port 22 of the fuel tank, a coalesced water drain port 44, and an air vent 46 which is connected to the top of the conventionally vented fuel tank 10 via line 48.

Located within the water discharge housing is a hydrophobic partition or cylinder 50 which is characterized in that it has an affinity for fuel, but an aversion for water. This hydrophobic partition may be formed of a pleated fine weave Teflon coated screen or other suitable porous element such as the element disclosed in my copending patent application Ser. No. 219,685, now Patent No. 3,189,182, which will permit flow of fuel therethrough, but which will prevent the flow of coalesced water therethrough.

Centrally located within the hydrophobic element 50 is a water syphon mechanism 52 comprising a tubular member 54 which is formed as part of a platform 56 and a second concentric tubular member 58 which is part of a non-porous block type deflector 60 which extends radially to the pleated hydrophobic element 50. The tubular member 54 has an opening 62 at the upper end thereof and a passage 64 therethrough which constitutes a preliminary or intermediate drain port. On the other hand, the second concentric tubular member 58 has a closed upper end and an opening 66 at the lower end thereof which is spaced from the platform 56. It will be understood by those skilled in the art that the syphon mechanism 52 is simply a variation of the classical syphon wherein a pipe or tube is bent to form two branches or legs of unequal effective length so that a liquid can be transferred to a lower level, over an intermediate elevation, by the pressure of the atmosphere in forcing the liquid up the shorter branch of the pipe immersed in it, while the excess of weight of the liquid in the longer branch (when once filled) causes a continuous flow. Such flow will take place only when the discharging extremity is lower than the liquid surface, and when no part of the pipe is higher above that surface than the same liquid will rise by atmospheric pressure. At sea level, this would be about 33 feet for water and 30 inches for mercury. Thus, in connection with the water syphon mechanism 52, it will be seen that the shorter branch of the syphon water passage means is formed by the space 68 between the two concentric tubular members 54 and 58 and that the longer branch of the syphon water passage means is formed by the passage 64 of the tubular member 54.

Located within and upstream of the hydrophobic element 50 is a non-hydrophobic filter element 70, which may be of the screen type, for preventing accidental clogging of the hydrophobic element 50 in the event that a filter water separator element ruptures and discharges solids into the filter separator sump. If such a filtering element is utilized, the pores in the filter element 70 should be smaller than the holes of the hydrophobic element 50 and the filtering area of the element 70 should be large enough to prevent re-emulsification of the fuel-water mixture entering inlet port 32.

In operation of the device, it will be seen that the fuel-water mixture will enter the inlet port 32 and pass through the filter element 70. Upon coming in contact with the hydrophobic element 50, the fuel in the mixture will pass readily therethrough and will fall to the bottom of the housing 38 and thence through the fuel outlet port 40. The coalesced water droplets in the fuel will be retained inside of the hydrophobic element 50 until the level of the water has risen to a first predetermined level $W_1$, at which time water will be discharged through intermediate drain port 64 until the water subsides to a second lower predetermined level $W_2$.

Under certain conditions of flow, it is possible that the percentage of water in the fuel passing through the device is of such proportions that the water level in the syphon chamber will not rise at a sufficiently rapid rate to completely submerge the upper end of the syphon. If this is the case, syphoning will not occur and only a "trickle" of water will flow through the drain passage 64. Although this does not affect the water separating function of the device, it is much more desirable to have a rapid change of water levels such as would occur during syphoning. Accordingly, in order to cause a more rapid rise of the water volume to the first predetermined level $W_1$, it will be noted that the block type deflector 60 is located so that it will reduce the effective volume in the center syphon chamber from just below the first predetermined level $W_1$ to just above this level. The block type deflector 60 is formed with a skirt type guide 72 which, in addition to its guide functions, reduces the effective volume of the syphon chamber, and with a conical upper surface for permitting maximum use of the fluid velocity head by deflecting fluid flow directly against the hydrophobic element. The preferred angle of the conical surface is between 35 to 45 degrees. The annular space inside of the skirt guide 72 is vented to the upper side of the deflector 60 through means of a vent tube 74. The block type deflector, which in effect is the upper portion of the water syphon mechanism 52, is maintained in proper spaced relationship through means of three pins 76.

In a device of the type described, it is possible for small amounts of fuel to be syphoned into the water outlet. This is due to the fact that it requires a certain hydrostatic head to force the fuel through the hydrophobic element 50 and this, though small, head forms a film of fuel on top of the water, which is subsequently carried off through the water outlet syphon.

One means of reducing such fuel "carry-over" is through utilization of the arrangement shown in FIGURE 2. In this arrangement, two water discharge mechanisms of the type described are mounted in series on top of each other so that the water syphon of the top assembly discharges into the hydrophobic cylinder of the lower assembly. In this manner the water, plus the slight amount of fuel carried over with the water, is exposed a second time to a hydrophobic cylinder and the overall efficiency of the device will be increased. Thus, for example, if one syphon chamber has a water separating efficiency of ninety percent (90%) and is arranged in series with another chamber also having ninety percent (90%) efficiency, then the overall efficiency of the system will be ninety-nine percent (99%). In FIGURE 2, it will be noticed that like parts in the second stage of the device are identified with like numerals, as in the first stage, plus 100.

The several practical advantages which flow from my water discharge device are believed to be obvious from the above, and other advantages may suggest themselves to those who are familiar with the art to which this invention relates. For example, in the event my device is subjected to below freezing temperatures, while it is not in operation, it may have ceased to operate just prior to a syphoning occurrence, in which case the accumulated water could freeze and close-off the water outlet. In this event the fuel-water mixture would then flow into the device until the water level fills the whole interior of the hydrophobic screen and will eventually spill over the top 78 and flow into the fuel outlet port 40. Such action will gradually heat the device and melt the ice until it functions normally again.

Furthermore, although my invention has been described in connection with a certain embodiment, it will be obvious to those skilled in the art that various changes may be made in the form, structure and arrangement of components without departing from the spirit of the invention. For example, the device need not be of the two-stage type as shown, but, if desired, may be of the single-stage type. Accordingly, I do not desire to be limited to the specific embodiment disclosed herein primarily for purpose of illustration, but instead desire protection falling within the scope of the appended claims.

Having thus described the various features of the invention, what I claim as new and desired to secure by Letter Patent is:

1. A water discharge device for receiving coalesced water and/or fuel from the sump port of a fuel filter water separator unit comprising a housing having an inlet port operatively connected to said sump port for receiving the flow therefrom, a fuel outlet port, and a coalesced water drain port, porous hydrophobic partition means located in said housing and interposed between said inlet port and fuel outlet port for separating said housing into first and second chamber means, said first chamber means communicating with said inlet and water drain ports and being on the upstream side of said partition means and the second chamber means communicating with said fuel outlet port and being on the downstream side of said partition means, said porous hydrophobic partition means being characterized in that fuel located in said first chamber means is permitted to flow therethrough into said second chamber means whereas coalesced water in said first chamber means is prevented from flowing therethrough to said second chamber means, syphon means located in said first chamber means for continuously discharging water from said first chamber means via said water drain port after said water has risen to a first predetermined level and until said water subsides to a second lower predetermined level, said syphon means including water passage means having two connected substantially vertical branches of unequal effective length, the longer of which is connected to the water drain port and the shorter of which is spaced from the bottom of said first chamber means and is open to the fluid therein, said first predetermined water level being determined by the position of the highest portion of said water passage means and said second lower predetermined water level being determined by the position of the open end of the shorter branch of said water passage means, said syphon means comprising a first tubular member having opening means located at the upper end thereof and having the lower end thereof communicating with said drain port to form the longer branch of said water passage means and a second concentric tubular member having a closed upper end and having opening means located at the lower end thereof to form the shorter branch of said water passage means between said tubular members, said second concentric tubular member having a non-porous block type deflector extending therefrom substantially to said hydrophobic partition means to reduce the effective volume in said first chamber means so that a more rapid rise of fluid will occur in the shorter branch of said water passage means.

2. A water discharge device, as defined in claim 1, wherein said porous hydrophobic partition means includes at least one fine wire mesh screen coated with a material having an affinity for fuel but an aversion for water.

3. A water discharge device, as defined in claim 2, wherein said fine wire mesh screen is in the form of a substantially cylindrical pleated element.

4. A water discharge device, as defined in claim 1, wherein said block-type deflector includes a skirt guide substantially in abutment with said hydrophobic partition means which extends below the opening means of said second concentric tubular member.

5. A water discharge device, as defined in claim 4, including a space between the skirt guide and the concentric tubular member, said space being vented to the upper surface of said block-type deflector.

6. A water discharge device, as defined in claim 1, wherein the upper surface of said block-type deflector has a substantially conical shape for permitting maximum use of the fluid velocity head by deflecting fluid flow directly against said hydrophobic partition means.

References Cited
UNITED STATES PATENTS

| | | | |
|---|---|---|---|
| 1,121,270 | 12/1914 | McDermott | 210—533 |
| 2,130,930 | 9/1938 | Rose. | |
| 3,214,368 | 10/1965 | Muller. | |
| 3,297,161 | 1/1967 | Kasten | 210—338 X |

FOREIGN PATENTS

| | | |
|---|---|---|
| 847,667 | 8/1952 | Germany. |
| 6,217 | 1896 | Great Britain. |

REUBEN FRIEDMAN, *Primary Examiner.*

D. M. RIESS, *Assistant Examiner.*